Nov. 28, 1961 E. LYON III 3,011,131
DIRECT CATHODE COUPLED AMPLIFIER
Filed Oct. 31, 1958
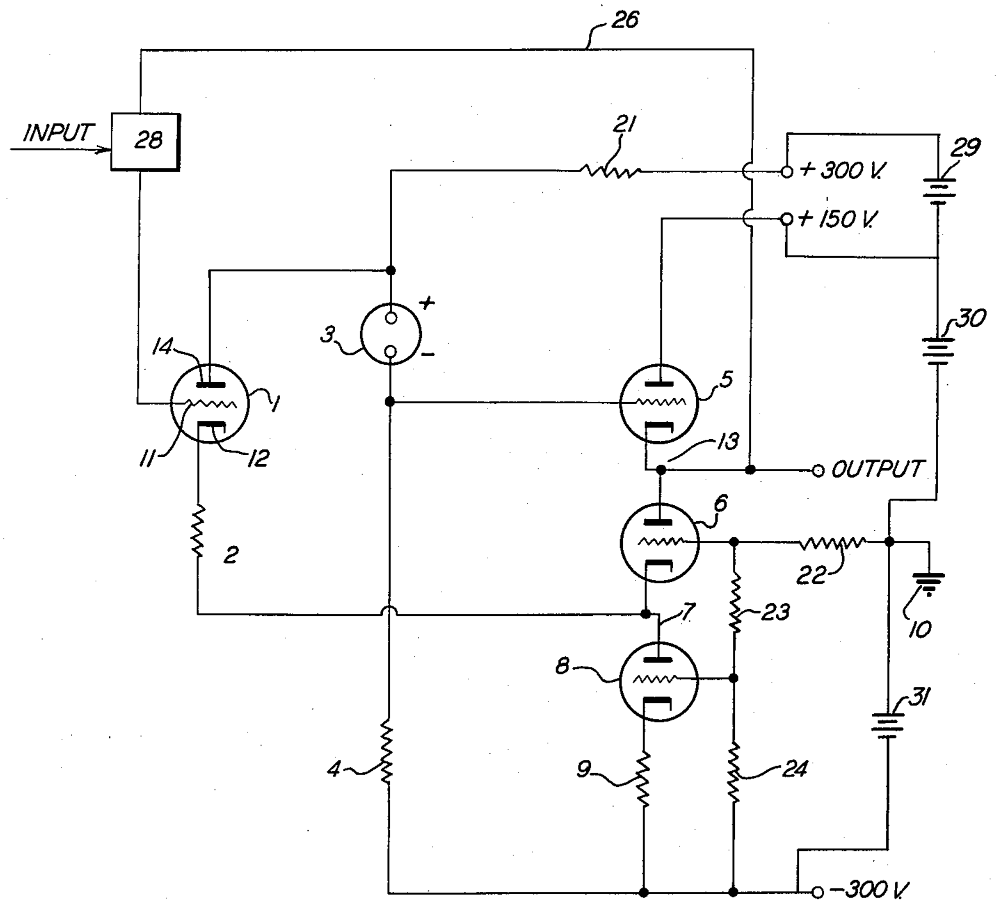
INVENTOR.
EDWIN LYON III
BY [signature]
ATTORNEY United States Patent Office 3,011,131

Patented Nov. 28, 1961

3,011,131

DIRECT CATHODE COUPLED AMPLIFIER

Edwin Lyon III, Lanham, Md., assignor to ACF Industries, Incorporated, New York, N.Y., a corporation of New Jersey Filed Oct. 31, 1958, Ser. No. 771,067

5 Claims. (Cl. 330—70)

This invention relates to amplifiers and more particularly to cathode follower type amplifiers employed in negative feedback amplifier systems.

In the design of electronic amplifiers there is a constant need to improve amplifier operation by devising component arrangements which will more nearly yield an ideal output. In cathode follower type amplifiers, a preferred design would yield a device having maximum efficiency, gain, linearity and stability and which would have a high dynamic impedance to the power supplies which feed it. This invention provides the advantages just mentioned and yet has the property of low power waste in resistive sinks or other power absorbing components whose purpose is to accommodate change in operating conditions.

It is therefore a broad object of this invention to provide a circuit for a direct coupled amplifier, intended for negative feedback applications.

It is another object of this invention to provide an amplifier including a cathode follower configuration output in which high gain, linearity and stability are functional features.

It is a still further object of this invention to provide an amplifier utilizing a cascode triode pair as the load impedance for its cathode follower output stage.

It is another object of this invention to provide an amplifier having a cathode follower output stage in which the cathode follower load comprises a cascode pair and which utilizes positive feedback from the cascode pair to an input stage, the purpose of which is to increase the amplification thereof.

These and other objects and novel features of the invention are set forth in the appended claims and the invention as to its organization and its mode of operation will best be understood from a consideration of the following detailed description of the preferred embodiment when used in connection with the accompanying drawing which is hereby made a part of the specification, and in which:

The drawing is a schematic representation of the preferred embodiment of the amplifier.

The preferred embodiment of this invention provides for an input stage whose plate signal is transferred through an isolated voltage supply to the grid of an output cathode follower stage which has a cascode triode pair as the cathode load. A positive feedback signal from the cascode pair is returned to the cathode of the input stage.

The amplifier is shown in the drawing as being a part of an amplifier group wherein an overall negative feedback signal is conducted by lead 26 to the preamplifier stages 28. Preamplifier stages 28 may consist of any non-inverting preamplifier arrangement such as an even number of standard stages.

The usefulness of a system utilizing internal positive feedback while necessarily retaining the negative feedback for the overall system, is set forth in Vacuum Tube Amplifiers, by Valley and Wallmeen, page 477.

In the following detailed description of the apparatus by which the objects of the invention are realized the various vacuum tubes are shown and described as triodes although the use of other tube types is comprehended by the invention.

Referring to the drawing, vacuum tube 1 operates as an ordinary amplifier which receives input signals on its control grid 11, and which also receives signals fed back from point 7 through resistor 2 to the cathode 12 of the tube 1. This amplifier stage is of common usage and may be made to have a voltage gain or amplification. The output of this amplifier stage is coupled from the plate 14 of tube 1 through the isolated voltage supply 3 to the grid of the cathode follower output vacuum tube 5. The isolated voltage supply 3 may be a gas tube or other device which maintains a constant voltage difference between its terminals. The cathode follower is unique in that it utilizes as a cathode return resistance a cascode connected pair of triode vacuum tubes 6 and 8. The output is taken at 13, the junction of the cathode of tube 5, and plate of tube 6. Voltage sources 29, 30 and 31 provide the supply voltages.

The cascode circuit 6 and 8 of vacuum tubes used as a cathode return impedance, serves to meter a signal, in phase with the output signal, but much reduced in amplitude, to the driver amplifier stage 1. The point 7 from which this feedback signal originates possesses characteristics of low source impedance and low signal voltage level, as well as a suitable quiescent voltage level for coupling this point 7 directly to the cathode of the driver stage 1. The resistor 2 is available to allow variations in the amount of positive feedback employed. It should be understood that the amplifier, as a whole, is connected as an inverse feedback amplifier, and that the amount of positive or regenerative feedback so provided by the aforementioned circuitry is insufficient to yield instability or oscillations. The divider network of impedances 22, 23 and 24 help set the quiescent bias of the cascode pair.

The impedance seen by the cathode of the output stage 5, looking into the cascode pair 6 and 8 may be expressed as:

$$Z=(\mu+1)[r_p+(\mu+1)R_9]+r_p$$

where the terms $\mu$ and $r_p$ represent the usual vacuum tube parameters of the cascode pair and $R_9$ represents the resistance value of the cathode resistor 9. It can be seen that this quantity can approach extremely high values (in the order of one million ohms), and thus affords the cathode follower 5 with a near infinite cathode return impedance. Under this condition the cathode follower possesses maximum gain, linearity, and stability. At the same time, the power supply is required to feed to the cathode follower a current which is very nearly constant regardless of the presence of an input signal.

This is due to the practically constant impedance seen by the negative voltage power supply.

In the preferred embodiment of the amplifier the following components are utilized although many variations are possible within the scope of the invention.

| Drawing reference: | |
|---|---|
| 1 | ½ 12AT7 type tube. |
| 3 | 150 v. Isoply. |
| 4 | 2 meg. resistor. |
| 5 | ½ 5687 type tube. |
| 6 | ½ 5687. |
| 8 | ½ 5687. |
| 9 | 10K resistor. |
| 22, 23, 24 | 50K resistors. |

Utilizing the above values the —300 volt bias is dropped across each of resistors 22, 23, and 24 in approximately equal amounts the quiescent voltage on the grid of the tube 5 is approximately −10 volts and the quiescent output is zero.

It should be understood that this invention is not limited to specific details of construction and arrangement thereof herein illustrated, and that changes and modifications may occur to one skilled in the art without departing from the spirit of the invention, and that any of the usual means of overall negative feedback may be employed, the scope of the invention being set forth in the following claims.

What is claimed is:

1. Amplifier apparatus comprising a cathode follower stage in which the cathode load includes a pair of vacuum tubes in cascode arrangement, an input amplifier stage having its output connected to the input of the cathode follower stage and means for supplying a regenerative feedback signal from the plate-cathode junction of the cascode pair to the input of the input stage.

2. Amplifier apparatus comprising a first amplification stage including grid and cathode elements responsive to an input signal source and a regenerative feedback signal, and an output stage having an output terminal and amplifier tube, said tube including a cathode impedance of two vacuum tubes arranged in cascode, the said feedback signal being derived at the plate to cathode connection of the cascode pair and means for conducting said feedback signal to the said cathode element whereby regenerative amplification results.

3. Amplifier apparatus comprising a first amplification stage including input grid and cathode elements the said grid being responsive to an input signal source and the cathode to a regenerative feedback signal, and an output stage having an output terminal and amplifier tube, said tube having a cathode load of two triode vacuum tubes arranged in cascode, the said regenerative feedback signal being derived at the plate to cathode connection of the cascode pair and means for conducting said feedback signal to said cathode element for effecting regenerative feedback.

4. Amplifier apparatus comprising an input amplifier stage having an output signal responsive to an input signal source and a feedback signal, cathode follower output means including an output terminal, cascode arranged vacuum tubes connected to the cathode of said cathode follower, and a feedback connection from the place-cathode junction of the cascode arrangement to the said input amplifier stage, and isolated voltage supply means for coupling the output signal input stage output signal to the cathode follower means.

5. Direct coupled amplifier apparatus comprising an amplifier stage having a first vacuum tube responsive to an input signal source and a regenerative feedback signal applied to the cathode of said first tube to provide an output at the plate of said first tube in accordance with the amplitudes of said input and feedback signals, a cathode follower output stage having a second vacuum tube whose cathode is connected to an output terminal and a pair of cascode connected vacuum tubes, the plate of one vacuum tube of said cascode pair of vacuum tubes being connected to said cathode of said second vacuum tubes, the second tube of said pair having its cathode return to a negative source so as to provide a cathode follower output stage in which the cathode follower load comprises a cascode arrangement of vacuum tubes, coupling means for passing the output signal from the first vacuum tube to the cathode follower output stage, and coupling means for passing the said regenerative feedback signal from the cascode pair to the first vacuum tube cathode.

References Cited in the file of this patent

UNITED STATES PATENTS

| | | |
|---|---|---|
| 2,658,117 | Sunstein et al. | Nov. 3, 1953 |
| 2,845,574 | Shapiro | July 29, 1958 |

OTHER REFERENCES

Text, Valley and Wallman, "Vacuum Tube Amplifiers," Radiation Lab. Series 18, 1948, pages 475–479 and FIG. 11.57.